United States Patent [19]

Pica

[11] Patent Number: 4,631,691
[45] Date of Patent: Dec. 23, 1986

[54] VIDEO DISPLAY DEVICE SIMULATION APPARATUS AND METHOD

[75] Inventor: Albert P. Pica, Middlesex County, N.J.

[73] Assignee: RCA Corporation, Princeton, N.J.

[21] Appl. No.: 610,006

[22] Filed: May 14, 1984

[51] Int. Cl.[4] .................................................. G06F 3/14
[52] U.S. Cl. ..................................... 364/521; 364/578; 340/728; 358/10; 358/139
[58] Field of Search ........................ 304/578, 521, 518; 358/10, 139, 87; 340/728

[56] References Cited

U.S. PATENT DOCUMENTS

| | | | |
|---|---|---|---|
| 3,736,411 | 5/1973 | Berndt | 364/521 X |
| 4,091,550 | 5/1978 | Schrenk et al. | 364/578 X |
| 4,127,849 | 11/1978 | Okor | 340/324 |
| 4,196,528 | 4/1980 | Forest | 364/578 X |
| 4,199,874 | 4/1980 | Barbarasch | 35/12 |
| 4,209,832 | 6/1980 | Gilham et al. | 364/521 |
| 4,242,678 | 12/1980 | Somerville | 340/728 |
| 4,303,938 | 12/1981 | Berke et al. | 358/139 |
| 4,345,224 | 8/1982 | Greer et al. | 340/728 |
| 4,383,827 | 5/1983 | Foerst | 364/578 X |
| 4,459,676 | 7/1984 | Oguchi | 364/521 |
| 4,475,104 | 10/1984 | Shen | 364/521 X |
| 4,513,318 | 4/1985 | Wilensky et al. | 358/10 X |

*Primary Examiner*—Edward J. Wise
*Attorney, Agent, or Firm*—Joseph S. Tripoli; William Squire

[57] ABSTRACT

A video display device may be simulated using a computer and a conventional video image processor. A test image which is an enlarged version of a typical image to appear on the simulated display device is generated. This enlarged test image is then digitally processed to replicate the effects of the various parameters of the display device which affect the image. The processed signal representing the image is then displayed on a test monitor, which is viewed from a distance which is proportional to the degree of enlargement of the test image.

9 Claims, 11 Drawing Figures

VIDEO DISPLAY DEVICE SIMULATION APPARATUS AND METHOD

The present invention relates to the simulation of various design parameters of a video display device, and more particularly, to such simulation utilizing digital video signal processing.

BACKGROUND OF THE INVENTION

Traditionally video display devices such as monitors and television receivers have been designed by physically constructing the device and testing the physical embodiment utilizing various test signals. In the design of the circuitry for the display device various parameters will affect the quality of the display image. These parameters include the bandwidth of the various amplifiers, the gamma of the cathode ray tube, the size of the electron spots on the cathode ray tube and the pattern of the phosphor on the display screen. Although various electrical measurements can be used to evaluate the design, in the end it is the viewer's perception of the displayed image which is the fundamental evaluation factor. One can easily appreciate that each of these parameters will independently affect the quality of the displayed image and several iterations of the prototyping may be necessary to visualize and test the effects of the design changes on the image presented by the display device.

In the prior art, the usual way of evaluating changes in various design parameters of the display device was to physically change the display device prototype. The physical prototyping and evaluation of the display device design was often expensive and time consuming.

With the advent of high speed, digital circuitry, the broadcast industry has now been presented with very sophisticated image processors capable of creating elaborate special effects, such as reducing or enlarging the size of the video image and altering the image on a picture element (pixel) by picture element basis. These image processors in conjunction with a computer digitize the video image so that each pixel can be represented by a separate digital word. The digitized image is mathematically processed in a high speed digital arithmetic unit so that the various pixels can be altered according to the preconceived effect. For example, these computer controlled image processors can be used to create a transition from one video image to another which can simulate the turning of a page in a magazine or a book. The processors can also be utilized to combine two separate images into one according to a given effect programmed by the operator.

A typical image proessor, such as the Gould/DeAnza model IP8500, provides memory for image storage and a digital arithmetic unit. The digital video processor actually is a series of arithmetic logic devices, each of which is capable of performing a mathematical function, such as addition, multiplication, logical AND, or logical OR. The arithmetic unit is capable of being controlled by a computer to electrically switch the connection of the inputs and outputs of the logic devices thereby configuring the arithmetic unit to mathematically process the image signal in almost an infinite combination of ways. The teleproduction special effects operator programs the image processor to set up a signal path so as to arithmetically alter the image according to the desired effect.

SUMMARY OF THE INVENTION

High speed video processing can be applied to the design of display devices to simulate the effects the design has on images without actually constructing a physical embodiment of the display device. A video signal representing a test image is generated and then processed so as to replicate the effects of the various parameters of the display device being simulated. The processed video signal representing the test image can then be displayed on a video monitor and evaluated.

BRIEF DESCRIPTION OF THE DRAWING

FIGS. 4a and 4b represent flowcharts of the detailed programming steps to be carried out in the character and phosphor sampling blocks of the FIG. 2 flowchart.

FIGS. 5a and 5b represent the detailed programming steps for the gamma processing blocks of FIG. 2.

FIGS. 8a and 8b represent the detailed programming steps for the bandwidth filtering and electron spot convolution blocks of FIG. 2.

DETAILED DESCRIPTION OF THE PREFERRED EMBODIMENT

Figure 1:
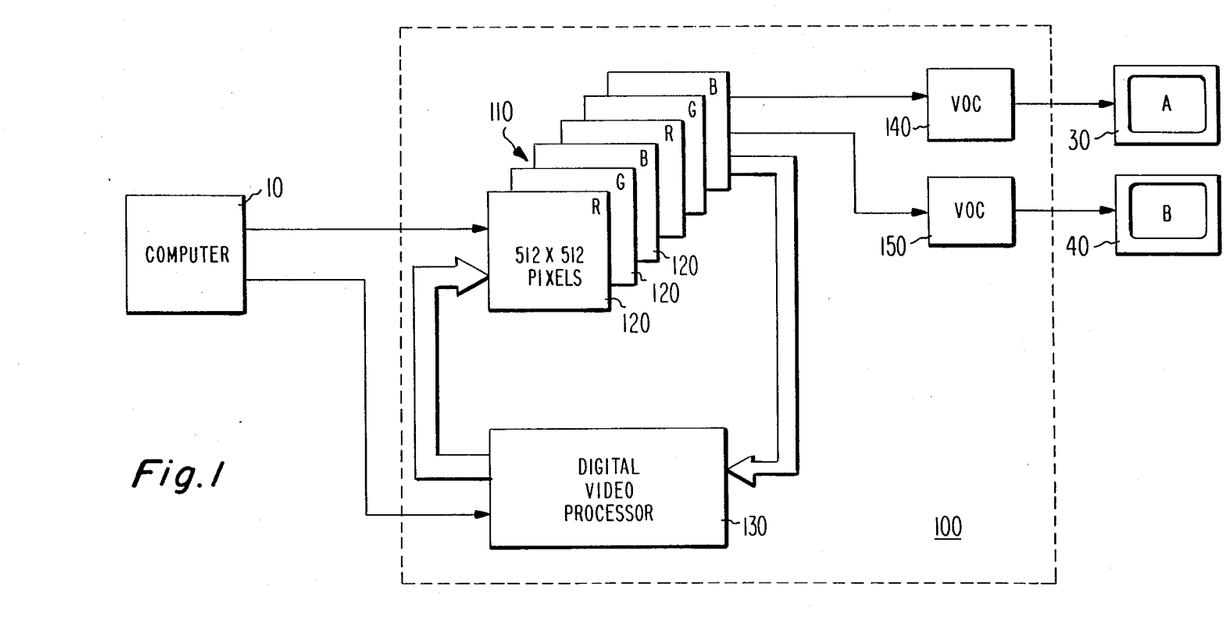
FIG. 1 is a block diagram of apparatus for digitally simulating the design of a video display device.

A video display device simulation system, as shown in FIG. 1, comprises a computer 10 and an image processing system 100. The computer 10 may be any of a number of general purpose programmable computers such as the Digital Equipment Corporation, PDP 11/24 Mini Computer. The image processing system 100 may be a Gould/DeAnza Model IP8500 which is typically used to generate special effects for teleproductions. This image processing system consists of a memory 110 containing a number of image planes 120. Each image plane is capable of storing a single digitized monochrome image comprising 512 lines having 512 pixels on each line with 8 bits per pixel. Three such memory planes 120 can be used to store the red, green and blue video component images for a color picture. Additional increments of three image planes can be utilized to store additional color images or, as will be described later, different processed versions of the same image.

The contents of the memory 110 is fed to a digital video processor 130 such that one or more memory planes can be simultaneously fed to the processor 130. The digital video processor 130 is essentially a high-speed arithmetic unit capable of performing a multitude of mathematical functions, such as addition and multiplication, utilizing various input digital signals representing the image in memory 110 or numerical constants from the computer 10. The output of the digital processor 130 is then fed back to the memory 110 for storage in various memory planes 120. For example, the corresponding red, green and blue image planes for a color image may be simultaneously fed to the digital video processor 130 and processed according to the programmed algorithm sent to the processor from the computer 130 and then stored back in the memory 110 in a different set of memory planes 120.

The output of the memory 110 may also be fed to one of several video output controllers (VOC), two of which are shown in FIG. 1 as VOC's 140 and 150. Each VOC is actually three digital-to-analog converters capable of simultaneously converting the red, green and blue components of the color picture into three analog signals. The converted analog signal from each of the digital-toanalog converters 140 and 150 provide the output of the image processing system 100 and may be fed, for example, to RGB video monitors 30 and 40.

The computer 10 controls the various functions of the image processing system 100. Specifically, the storage of images in various planes of the memory is governed by output from the computer 10; as is the specific mathematical processing carried out in the digital video processor 130. Although the arithmetic processing is carried out in the video processor 130, the exact nature of that processing is based on commands from the computer 10, similar to the way in which the processor is computer controlled for special effects. The computer control and its interface with the image processing system will be better understood with respect to the description of the display device simulation.

The display device simulation starts out with a test pattern image which is enlarged to fifty times the normal image size as would normally be displayed on the simulated video display device. This enlarged image, or more properly the portion of it which now fills the screen, is then processed so that the image signal is altered according to the effects of various parameters of the display device being simulated (see FIG. 2). For example the signal representing the enlarged image may be altered to replicate the effects of the bandwidth of an amplifier used in the display device. Once the enlarged image has been processed to replicate the effects of the various parameters, the image is displayed on a video monitor. The displayed image is then viewed from fifty times the normal viewing distance so as to give the image the proper perspective to the viewer evaluating the simulation as the image would have if it had not been enlarged by the processing. The enlarged image and increased viewing distance are used so as to overcome the characteristics and limitations of the particular presentation monitor being used in the simulation.

The following detailed example describes the simulation of a computer terminal monitor having a color cathode ray tube. However, one skilled in the art could readily adapt the present invention for purposes of evaluating and simulating the designs of other types of video display devices, such as monochrome monitors and color television receivers.

Figure 2:
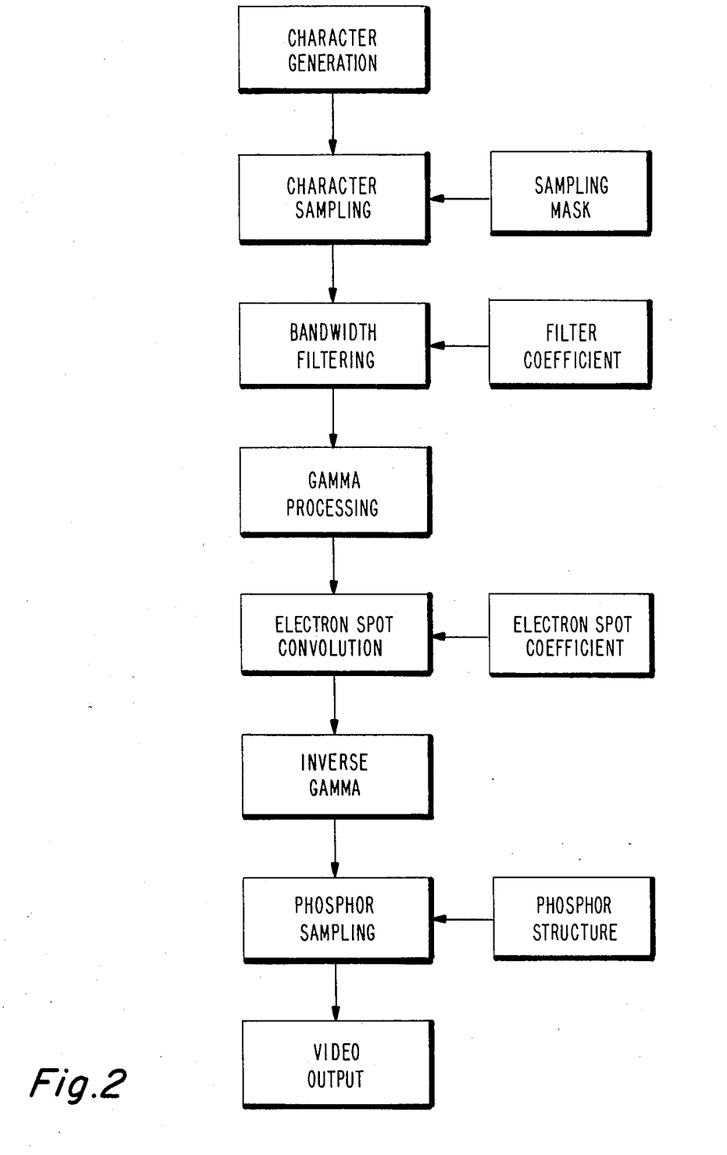
FIG. 2 is a flowchart of typical signal processing for simulating a video display device utilizing the apparatus of FIG. 1.

With reference to the flowchart of FIG. 2, initially, a test pattern must be generated. This may either be done by generating a test image in the computer 10 which is then stored in the image processing system 100 or by taking an actual video image and digitizing it for storage in the processor system 100. In the case of the simulation of a computer terminal monitor, the computer 10 may generate a pattern of alpha-numeric characters similar to those which might be normally displayed on the computer terminal. A portion of the image is then enlarged, for example, by fifty times so that one-fiftieth of the normal image to be displayed on the computer terminal would then occupy the entire screen of the monitor. The enlargement step is essentially the same as that which is used in video production to "blowup" a portion of a television image.

Figure 3:
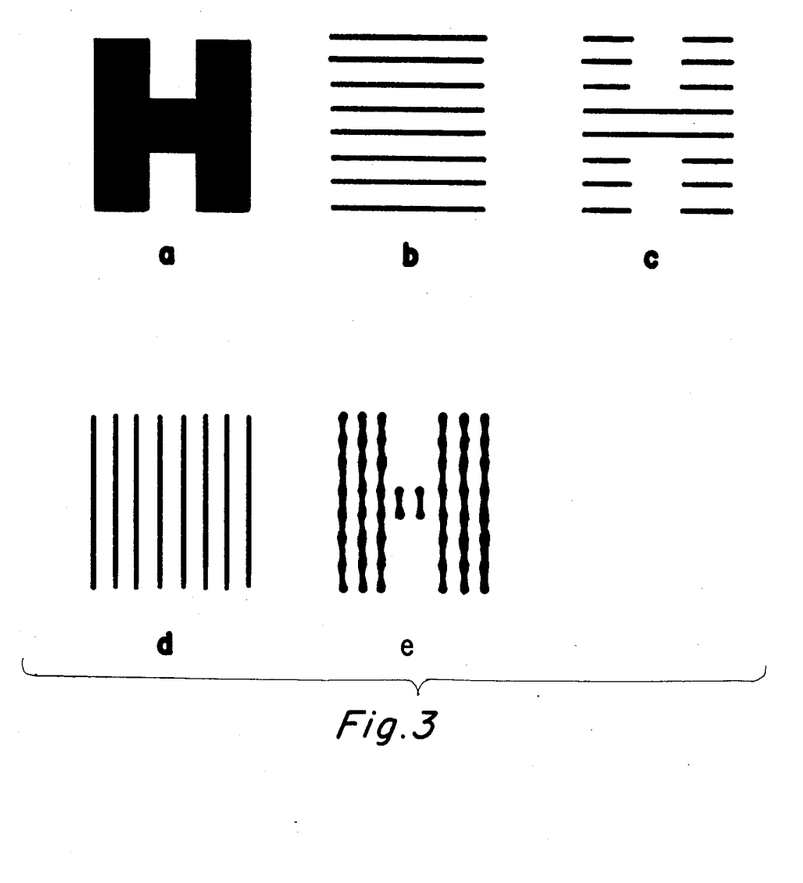
FIG. 3 represents the processing of one character in the simulation of a computer terminal monitor.

In the next processing step, the enlarged image is then transformed utilizing a sampling mask to replicate the effects of the raster scan lines on the image. For example with reference to FIG. 3, a character position in the enlarged image may contain the letter H as shown in FIG. 3A. In the first pass through the digital video processor 130 the image stored in the memory 110 is logically "ANDed" with a mask representing the horizontal scan lines of the simulated monitor. Since the letter H in its enlarged form will span several times the number of horizontal scan lines when displayed on the simulation monitor 30 as it would span in its reduced form on the simualted display device, the stored image is ANDed with a mask containing an enlarged pattern of horizontal lines representing the actual number and width of the raster scan lines which the image would occupy in the simulated monitor. For example with reference to FIG. 3, a typical character position of the mask is shown in FIG. 3B. This mask is generated in and transfered from the computer 10 to one input of the digital video processor where the processor ANDs it with the image from the memory 110. Soecifically, looking at one character position, the H in FIG. 3A when ANDed on a pixel by pixel basis with the mask of FIG. 3B produces a character comprised on a series on horizontal lines such as shown in FIG. 3C. The image conversion from this masking process is then stored in another series of three memory planes 120 in the processor memory 110.

Therefore, the first step of the image processing in the display simulation reduces the enlarged image to an image composed of psuedo-scan lines. These psuedo-scan lines correspond to the scan lines the image would span in the simulated display device. This produces a reduced resolution image representative of the test image as it would be displayed on the simulated display device.

The procedure for setting up the image processing system 100 to perform each step in the flow chart (FIG. 2) is similar to the procedures used in teleproduction to program the system to generate a video special effect. The first step in the procedure is to gather information about the monitor characteristic to be simulated. In the case of the character sampling, this would involve determining the number of scan lines that are used to display the character on the simulated monitor. The sampling mask image is then generated and stored either in the computer memory for transfer to the processor 100 or in the processor memory directly.

The operator then uses a schematic block diagram of the digital video processor 100 to map the signal path and interconnections to be entered into the processor, in much the same way as a special effect is planned. For example, the path can be mapped in order to AND two images or process the signal according to a mathematical equation such as for image convolution as will be described later. The memory locations for the image sources and output image storage are also determined. This interconnection and signal path information, along with equation constants are then stored in the computer 10 for down loading into the image processor 100 during image processing. This signal path information is used during simulation processing to route the video signal through the processor 100 and its component arithmetic units. The manufacturer of the image processing system 100, in this case the DeAnza Imaging and Graphics Division of Gould Inc., provides the software for the computer 10 which enables the engineer performing the simulation to define the signal path and interface the image processor with the computer 10. However, the engineer still must map the specific signal path through the processor 100 in order to carry out the simulation of the desired monitor characteristic. The configuring and operation of the image processor to carry out the monitor simulation would be easily understood by one having ordinary skill in operating this type of computerized video processing equipment.

Once the character sampling has been completed, a next processing step in the flowchart (FIG. 2), bandwidth filtering, maybe started. Prior to processing of the image, the combined frequency response of the various amplifiers and components of the display device circuitry is determined. A Fourier transform of the frequency response is done to get a point-spread function for the frequency response. The point-spread function is then scaled to the character size of the test image. The analytical expression of the point spread is then stored in the computer 10. The point-spread function is then convolved with the image stored from the previous step in the simulation. This convolution process requires that the image stored in the memory 110 be passed through the digital video processor several times (one pass for each element in the point spread function). At the end of the convolution process new image components have been stored in the corresponding red, green and blue image planes of the memory 110. This convolved image now has the appearance as though an analog signal of the image had been passed through a bandwidth filter having the frequency response of the simulated display device.

The next step in the flowchart (FIG. 2) is processing the image to simulate the gamma response of the cathode ray tube for the display device. The gamma represents the characteristics of the electron gun, and specifically the grid voltage versus the electron beam current produced in the cathode ray tube of the display device. The gamma can be represented in the processing system by either a mathematical equation or by storing the relationship in a look-up table. The individual pixels of each of the red, green and blue component images stored in the memory 110 are then fed through the digital video processor 130 and the gamma transformation is applied to alter the image according to the gamma of the display device being simulated. For example, if a pixel has a value Y, and the Gamma is 3, the new pixel value will be $Y^3$. The output from the Gamma processing is then stored into three of the memory planes 120.

The next step in the image simulation is to replicate the effects of the electron spot size of the cathode ray tube (CRT). The shape of the electron spot can be specified as either an analyticial expression or in tabular form. This gives the flexibility of also simulating the effect of electron spots that are measured from a sample CRT. The electron spot replication will require a convolution in both the horizontal and vertical dimensions, since the electron spot size parameter will affect both dimensions of the image. Therefore, the convolution of the electron spot profile with the image previously stored in the memory 110 is a two step process, once for the horizontal and again for the vertical dimension of the image, if the spot profile is separable in the vertical and horizontal directions. If the spot profile is non-separable then a full two dimensional convolution of the spot with the test pattern must be performed.

Because the simulated image will be displayed on an actual video monitor, such as monitors 30 and 40 shown in FIG. 1, the processing of the image must take into account the gamma characteristic of this presentation monitor. Therefore, an inverse gamma processing must be included to counteract the effects that the gamma of the presentation monitor will have on the simulation process. In the next step, the image will be processed similar to the previous gamma replication, except the inverse of the gamma transformation for the monitor being used to display the simulated image will be used as the arithmetic function.

Following the inverse gamma transformation, the effects of the phosphor structure of the simualted display device will be replicated onto the test image. Typically, most color cathode ray tubes utilize a vertical line phosphor structure which is represented by a mask having a series of vertical lines, such as shown in FIG. 3D. Since the enlarged characters, such as the letter H in FIG. 3A, will span many times the number of phosphor stripes in the simulation process than in the simualted device, the mask of the phosphor striping is used to simulate the phosphor structure. The width of the phosphor stripes on a sample CRT may be measured and the width enlarged by the same amount as the test image. The mask is then generated as alternating red, green and blue vertical lines of the enlarged width. As with the character sampling, which replicated the horizontal scan line structure, the phosphor structure (FIG. 3D) is logically ANDed with the video image. Each color image (is red, green or blue) is ANDed with the colored stripe pattern for that image. For example, the red image stored in a memory plane 120 is ANDed with the pattern of stripes representing the red phosphor pattern. Utilizing the example of a single character on the display screen as we did with the character sampling, the letter H, which now has the form similar to that in FIG..3C, is ANDed with the mask of FIG. 3D to produce the letter H as is shown in FIG. 3E. Although it would seem that the ANDing of the patterns of FIGS. 3C and D would produce a dot matrix image, the resultant image has the appearance of vertical lines because of the intervening electron spot convolution. The output of the ANDing of the image with the vertical stripe mask is once again stored in three image planes of the memory 110.

At this point, the image has been processed to replicate the various parameters of the simulated display device. The red, green and blue image planes corresponding to this processed image then can be simultaneously read out and fed to different channels of a first digital to analog converter 140 and fed as RGB video signals to a first monitor 30. If the image processing system 100 contains sufficient memory planes 120 to permit the original unprocessed image to have been retained in memory, the three planes of memory 120 representing the red, green and blue components of that image can be fed to a second video output controller (VOC) 150 and to a second monitor 40 for a side by side comparison of the unprocessed and processed images.

Since the image has been greatly enlarged for the simulation purposed, so as to overcome many of the effects that the particular display monitors 30 and 40 would have on the simulation, the displayed images must be viewed from a proportionately greater distance so that the viewer's perception of these images corresponds to the perception of the display on the simulated device. For example, if the image was enlarged fifty times such that one fiftieth of the actual display device image was being used in an enlarged fashion, the viewer of the simulated image would have to stand fifty times farther from the monitors than he would from the actual display device in order to get the same perceptual effect as viewing the actual image from a standard viewing distance.

With the computer simulation of the image, the designer of the display device can easily change the various parameters being simulated and quickly perceive the effects of these variations without having to physically alter a prototype of the display device. In addition, other parameters, such as misconvergence of the three electron beams in the display device, can be simulated to show their effects on the image.

Figure 4A:
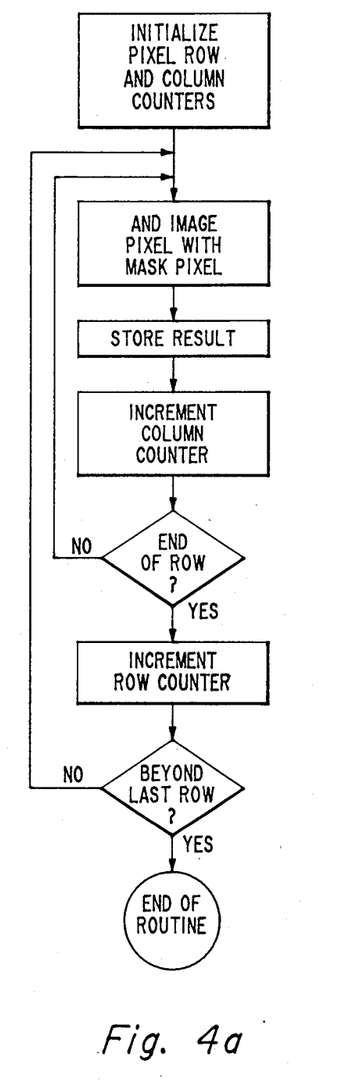
FIG. 4a is a generic flowchart and FIG. 4b is a flowchart for the operation of the Gould/DeAnza model IP8500 image processor.
Figure 4B:
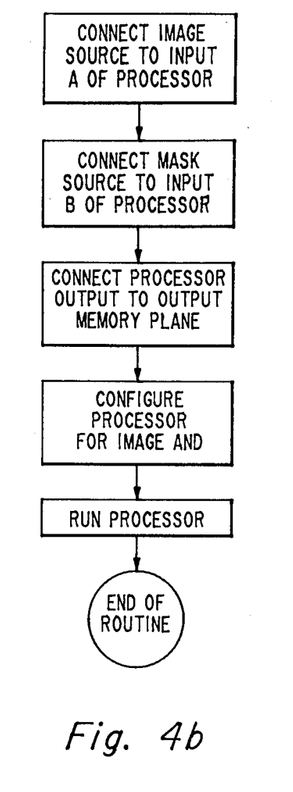

FIG. 4a shows generic hardware and language independent computer programming steps for the character sampling and phosphor sampling blocks of FIG. 2. FIG. 4b represents the same operation in terms of a flowchart of the steps necessary to enable the Gould/DeAnza model IP8500 image processor to carry out the sampling functions. As noted previously, these sampling functions logically AND the image with a mask representing the line and phosphor dot structures respectively (see FIG. 3).

Figure 5A:
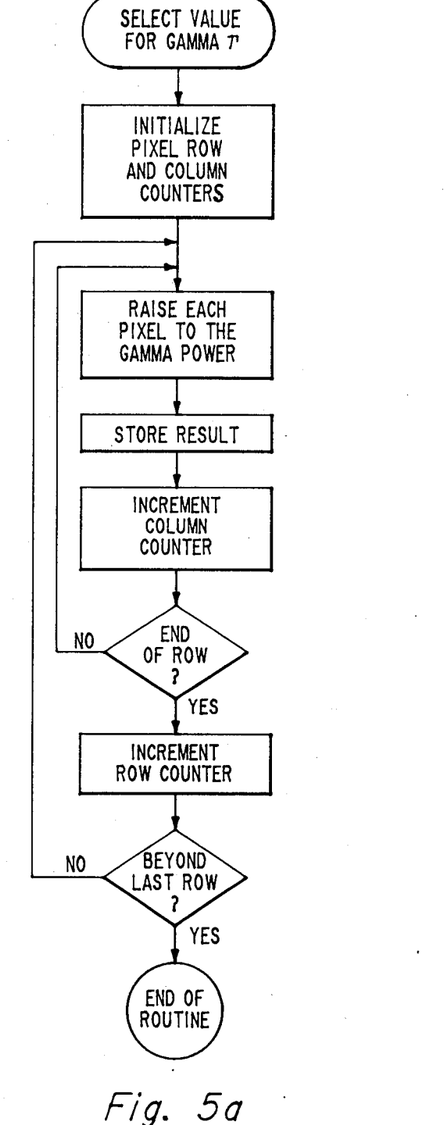
FIG. 5a represents the generic program steps and FIG. 5b represents the programming steps for the Gould/DeAnza image processor.
Figure 5B:
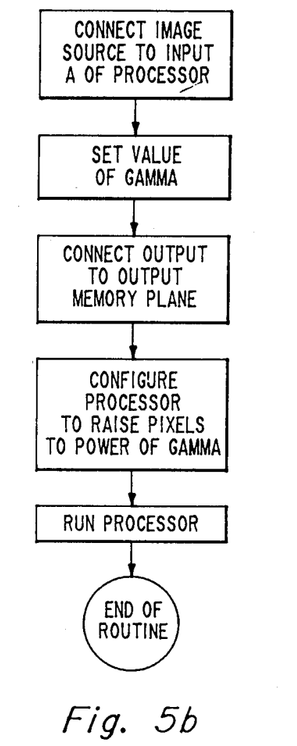

FIGS. 5a and 5b similarly represent generic and machine specific flowcharts for the gamma processing and inverse gamma blocks of FIG. 2. Although the steps for each FIG. 2 block are the same, in the gamma processing block, gamma has a positive value; whereas when the routine is used in the inverse gamma block, gamma has a negative value.

Figure 6:
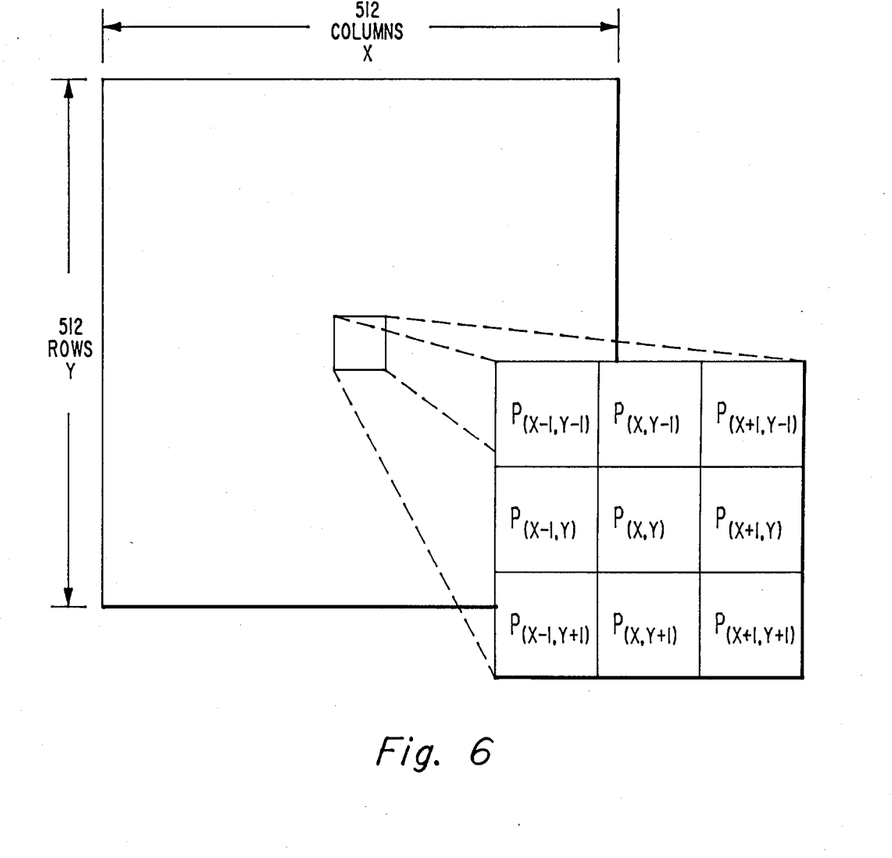
FIG. 6 represents a 512×512 pixel image with an enlargement of 9 pixels in the interior of the image.
Figure 7:
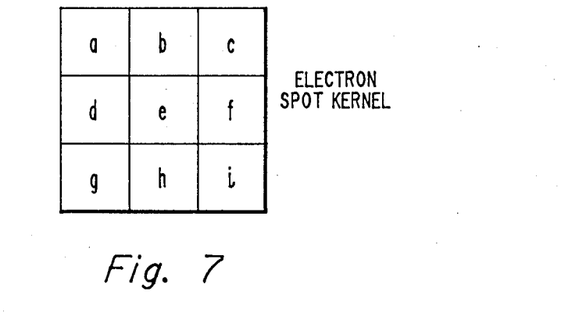
FIG. 7 represents a 3×3 kernel for the convolution function.

As noted previously the bandwidth filtering and the electron spot convolution blocks both involve convolving a coefficient kernel with the image. FIG. 6 represents a source image consisting of picture elements (pixels) arranged in an matrix of 512 rows and 512 columns. A 3×3 pixel sub-array of the image has been enlarged in the Figure and the relationship of each of the pixels to a given pixel P(x,y) in the center of the sub-array has been shown. FIG. 7 represents the two dimension coefficient kernel employed for simulating the effects of the two dimensional electron spot. The bandwidth filtering simulation uses a one dimensional kernel function. For simplicity, the kernel in FIG. 7 is a 3×3 element array, whereas in practice each dimension could approach thirty, for example. In the digital domain, the electron spot convolution is carried out by scanning the kernel over the image, and for each pixel P(x,y) in the image a new value, P'(x,y), is computed according to the following equation:

$$P'(x,y) = aP(x-1,y-1) + bP(x,y-1) + cP(x+1,y-1) + dP(x-1,y) + eP(x,y) + fP(x+1,y) + gP(x-1,y+1) + hP(x,y-1) + iP(x+1,y+1) \quad (1)$$

Figure 8A:
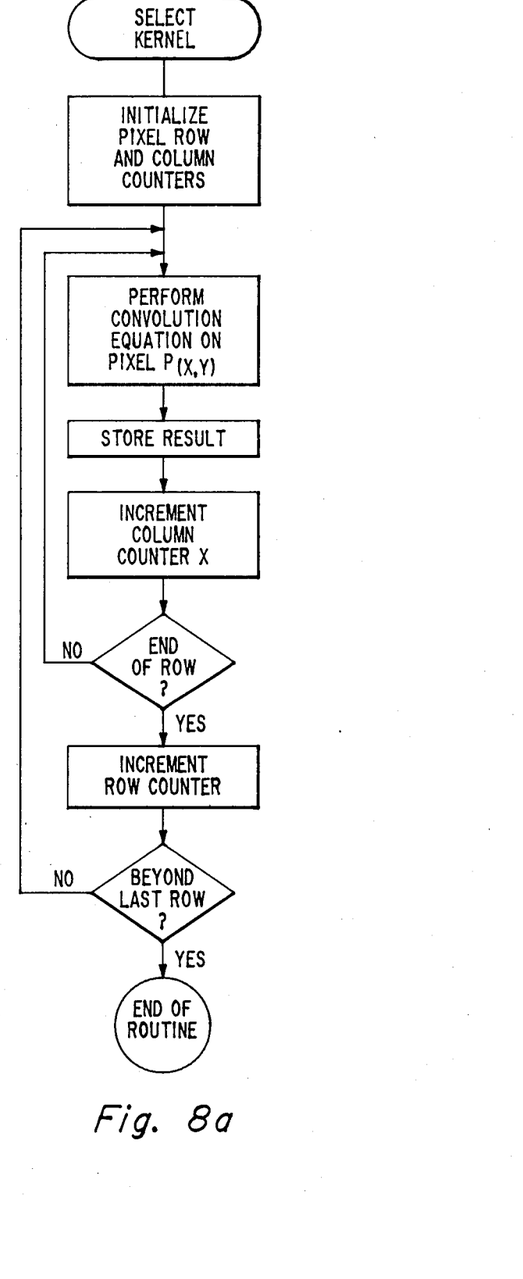
FIG. 8a is a generic flowchart and FIG. 8b is a flowchart of the programming steps for the Gould/DeAnza image processor.

The scanning can be carried out by the generic programming steps shown in FIG. 8a.

Figure 8B:
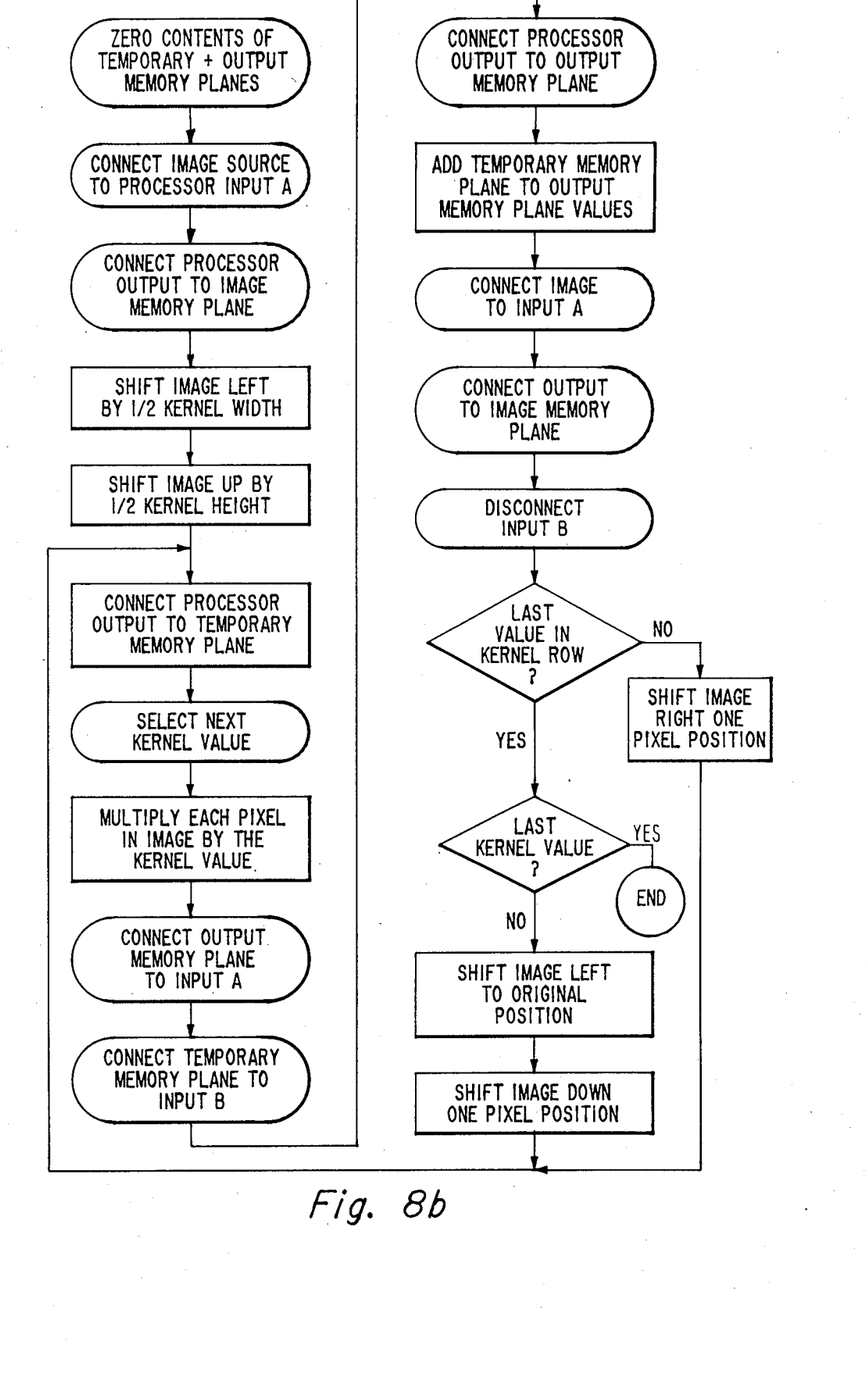

As noted previously with respect to the use of the Gould/DeAnza video processor to carry out the bandwidth filtering and electron spot convolution steps of FIG. 2, the image stored in memory 110 is passed through the video processor 130 once for each of the elements in the convolution kernel. This processing using the Gould/DeAnza system is shown in the detail flowchart of FIG. 8b. This later process is another method of solving equation (1) for each pixel and produces and equivalent output to that of the generic program.

I claim:

1. A method of simulating a video display device comprising the steps of:
    generating a video signal representing a test image;
    processing the video signal so as to replicate the effect that the display device has on the video signal; and
    displaying the processed video signal on a video monitor.

2. The method as in claim 1 wherein the processing step includes digitizing the video signal, storing the digitized signal representing the test image, and arithmetically processing said stored image to replicate the effect of the display device.

3. The method as in claim 2 wherein the processing step includes convolving the digitized image with a Fourier transform of the frequency response of the display device.

4. The method as in claim 2 wherein the processing step includes masking the stored image to replicate the video scan lines onto the test image.

5. The method as in claim 2 for simulating a display device having a cathode ray tube wherein the processing step includes masking the stored image to replicate the cathode ray tube phosphor pattern onto the test image.

6. The method as in claim 2 for simulating a display device having a cathode ray tube wherein the processing step includes convolving the stored digitized image with the electron beam spot profile for the simualted display device.

7. The method as in claim 1 wherein the test image is enlarged X times with respect to the size that the image would normally have on the simulated display device and further comprising the step of viewing the displayed processed signal from a distance from the video monitor which is X times the typical viewing distance.

8. The apparatus in claim 7 wherein the replicating means comprises a video processing system including:
    a digital memory for storing the test image;
    a high speed digital arithmetic processor for processing the test image and for sending the test image to the memory, and
    a digital-to-analog converter for translating the stored digital image into an analog signal.

9. An apparatus for simulating a video display device comprising:
    a computer for controlling the simulation;
    means responsive to the computer for replicating on a test image the effects of at least one parameter of the simulated display device; and
    a video monitor for displaying the output from the replicating means.

* * * * *